May 3, 1966 G. T. SENDRO 3,249,759
CONDITION CONTROL GALVANOMETER WITH PHOTOELECTRIC LIMIT SENSING
Filed Oct. 31, 1962 4 Sheets-Sheet 1

Inventor
GEORGE T. SENDRO
by: Cavanagh & Norman.

Inventor
GEORGE T. SENDRO
by: Cavanagh & Norman

May 3, 1966 G. T. SENDRO 3,249,759
CONDITION CONTROL GALVANOMETER WITH PHOTOELECTRIC LIMIT SENSING
Filed Oct. 31, 1962 4 Sheets-Sheet 3

Inventor
GEORGE T. SENDRO by: Cavanagh & Norman

May 3, 1966 G. T. SENDRO 3,249,759
CONDITION CONTROL GALVANOMETER WITH PHOTOELECTRIC LIMIT SENSING
Filed Oct. 31, 1962 4 Sheets-Sheet 4

Inventor
GEORGE T. SENDRO
by: *Cavanagh & Norman*

United States Patent Office 3,249,759
Patented May 3, 1966

3,249,759
CONDITION CONTROL GALVANOMETER WITH PHOTOELECTRIC LIMIT SENSING
George Tibor Sendro, 76 Sir Williams Lane, Islington, Ontario, Canada
Filed Oct. 31, 1962, Ser. No. 237,787
8 Claims. (Cl. 250—231)

The invention relates to a self-regulating condition control apparatus for continuously maintaining a predetermined condition level such as temperature and the like.

In such a control device it is generally desirable that a continuous visual reading of the temperature or like condition is provided in order that an operator may have accurate information at all times. In addition, such control devices should provide for switching off, for example, of heating coils at a predetermined high temperature and switching on at a predetermined low temperature.

Such prior control devices as have generally been available have suffered from a variety of defects such as for example inability to provide a continuous accurate reading even while the apparatus is at its predetermined limit. Further, such disadvantages include lack of sensitivity at or near the limit condition, lack of temperature compensation, insufficient damping of the fluctuations in the condition, and lack of overcorrection safeguards.

Accordingly, it is an object of the invention to provide a control apparatus for regulating a predetermined condition which is safe and reliable in operation and which is efficient and comprehensive in its function.

More specifically, it is an object of this invention to provide a control apparatus having the foregoing advantages in which a continuous visual reading of the condition is provided at all times.

More specifically, it is an object of this invention to provide a control apparatus having the foregoing advantages in which a predetermined high limit may be set while leaving the visual reading free from restriction.

More specifically, it is an object of this invention to provide a control apparatus having the foregoing advantages which is provided with means limiting and reducing the fluctuation of said condition.

More specifically, it is an object of this invention to provide a control apparatus having the foregoing advantages in which both a high limit and a low limit can be preset at varying intervals, while leaving said apparatus free to provide a continuous accurate reading at all times.

The invention seeks to achieve the foregoing and other objectives which will become apparent from the following description of a preferred embodiment by the provision of a self-regulating condition control apparatus and comprising: a condition sensing device generating an electrical condition signal relative thereto; means operable to change and regulate said condition in response to a control signal; a galvanometer responsive to said condition signal and having a galvanometer arm to indicate said condition; at least one limit setting device forming part of said galvanometer and operable to impose a predetermined limit upon change in said condition; sensing means forming part of said limit setting device responsive to passage of said galvanometer arm adjacent thereto to create a limit signal; and relay means responsive to said limit signal to establish a control signal as aforesaid.

A preferred embodiment of the invention will now be described by way of example only with reference to the following drawings in which like reference devices refer to like parts thereof throughout the various views and diagrams and in which.

The following description of a preferred embodiment is directed to a control device for regulating heating but other applications could equally well be described without limiting the invention.

Figure 1:
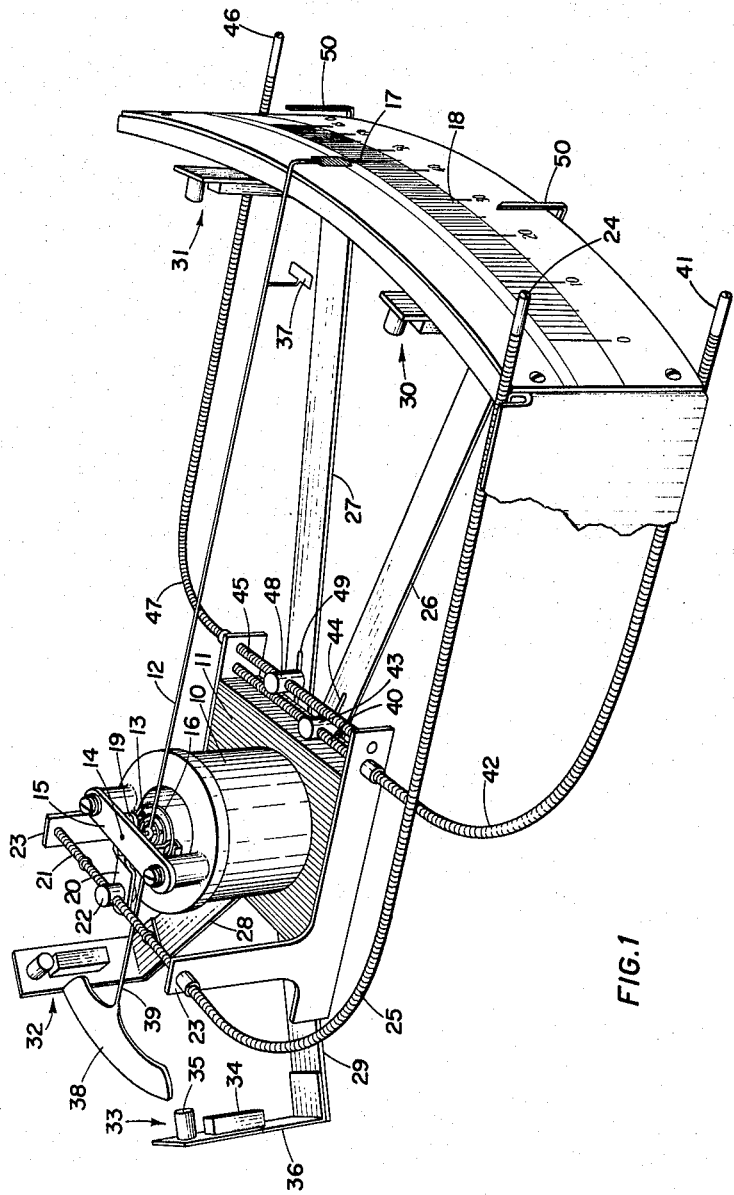
FIGURE 1 is a perspective cut away and simplified view of a control apparatus according to the invention.
Figure 2:
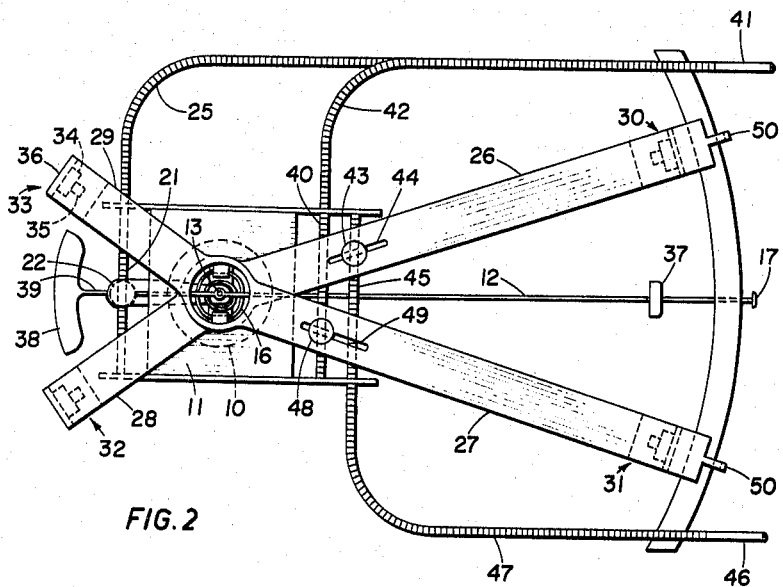
FIGURE 2 is a bottom plan view of the apparatus of FIGURE 1 and, FIGURE 3 is a circuit block diagram showing the operation of the apparatus of FIGURE 1.

From FIGURES 1 and 2 it will be seen that the preferred embodiment of the control device according to the invention, which comprises the moving coil galvanometer 10 mounted on a base 11 and having a pointer or galvanometer arm 12 extending therefrom which is pivotally mounted by shaft 13 in bearing 14 carried on bearing plate 15 at its upper end, a similar bearing being provided at the lower end of shaft 13 (not shown). Hairsprings 16 are provided for restricting movement of arm 12 and returning it to zero in known manner. Arm 12 is provided with index needle 17 extending over index 18 graduated according to any desired scale, in this case degrees centigrade. In order to reset the needle 17 to zero on index 18, adjustment is provided by crank 19 rotatably mounted on bearing plate 15 about the axis of shaft 13 and carrying one end of a hairspring 16 fastened thereto. Crank 19 is extended to provide lever 20 connected to threaded screw 21 by means of follower 22. Screw 21 is rotatably mounted between end plates 23 and is rotatable by means of screw head 24 and flexible drive 25 to cause movement of follower 22 along screw 21.

In order to provide means for presetting upper and lower limits to the heating range desired, the preferred embodiment of the instant control device incorporates four locating arms 26, 27, 28 and 29 pivotally mounted for rotation about the axis of shaft 13 (see FIGURE 2). Each said locating arm is provided with respective sensing means 30, 31, 32, and 33 for sensing passage of galvanometer arm 12 adjacent thereto. Each said sensing means is identical in construction and comprises a photo-sensitive device 34 in the form of a conventional miniaturised photo-diode cell and a light radiation source 35 oriented in registration therewith and spaced a short distance therefrom, both members being mounted on pillar 36. It will be understood that the remaining said sensing means, being identical, are not described in detail herein. Flag or masking member 37 is mounted on arm 12 close to the rear of index 18 and remote from galvanometer 10 and is oriented to pass through the air gap between photo-sensitive device 34 and light source 35 of sensing means 30 and 31 when swinging along its predetermined path about shaft 13. A similar flag or masking member 38 of larger size is provided on rearward extension 39 of arm 12 and is oriented to pass through the air gap between photo-sensitive device 34 and light source 35 of sensing means 32 and 33. Locating bars 26 and 28 are in fact formed integrally with one another and meet at an obtuse angle and similarly locating bars 27 and 29 are also of integral construction meeting at a similar angle. In this way, adjustment of the location of sensing means 30 and 32 is achieved by means of threaded screw 40 driven by screw head 41 and flexible drive 42. Follower 43 is slidably located in slot 44 formed along arm 26 and is driven by screw 40. Similarly adjustment of location of sensing means 31 and 33 is achieved by means of screw 45 driven by screw head 46 and flexible drive 47 and in turn drives follower 48 which is carried in slot 49 on arm 27. Locating bars 26 and 27 are provided with pointers 50 and 51 for precise setting on index 18.

Figure 3:
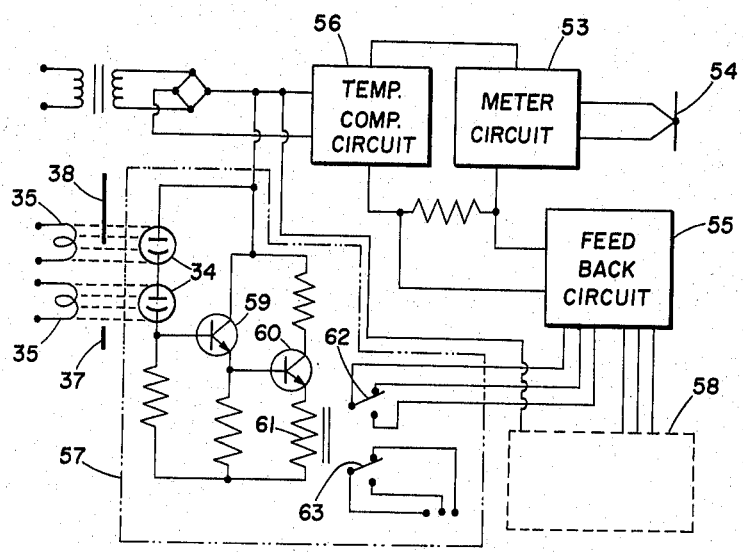

References is now made to FIGURE 3 showing a block circuit diagram of the instant control apparatus. The galvanometer circuit is represented by block 53 being connected in this particular example to a thermo-couple 54 and being responsive thereto to indicate temperature on index 18 in the usual way. The feed-back circuit, represented by block 55, is connected to galvanometer circuit 53 and operates to reduce fluctuations in temperature by anticipating the rise and fall thereof. Various well-known galvanometer circuits may be used for this purpose such as that described in Technische Temperatur Messungen by G. H. Lindorf (published by W. Girardet, Essen, Germany 1952, pages 56, 57 and 87. The temperature compensating circuit represented by block 56 is connected to the galvanometer circuit 53 and is responsive to the ambient temperature around the instrument to compensate for variations in the sensitivity thereof induced by temperature change. Various well-known compensation circuits may be used for this purpose such as that described in Instrument Technology by E. B. Jones (Butterworths Publication, London, 1953), vol. 1, page 254. Block 57 shown in phantom encloses the sensing circuit controlled by signals delivered by the sensing means 31 and 33. An identical circuit is provided for sensing means 30 and 32 but is shown merely as block 58 for clarity. The sensing circuit in this embodiment comprises photo diodes 34, 34 which are normally exposed to light radiation from light sources 35, 35, and a continuous signal is thus passed to NPN transistor 59 thus permit current to flow therethrough. Such current will in turn permit NPN transistor 60 to pass current and this will in turn energize relay winding 61 maintaining relay 62 and 63 in position; relay 63 passing heating current to suitable heating devices (not shown).

In operation galvanometer arm 12 swings across the index 18 in response to a rise in temperature and when mask 37 reaches the air gap between photo-sensitive device 34 and light source 35 of sensing means 31 it will intercept the light beam and photo-sensitive device 34 will cease to be activated thereby and the signal will cease to pass notwithstanding that the photo-sensitive device 34 of sensing means 33 is still activated since the two devices are in series. Transistors 59 and 60 will cease to pass current and winding 61 will become de-energized permitting relays 62 and 63 to switch and relay 63 will cut off the heating current at this point. Switching of relay 62 from one contact to another reverses the feed-back circuit in known manner simultaneously. In many applications the temperature at thermocouple 54 will continue to rise for a period and this will cause galvanometer arm 12 to continue to swing up index 18 indicating the true temperature at all times. Such movement will cause mask 37 to pass by sensing means 31 reactivating photo-sensitive device 34. However, just before this occurs mask 38 will pass into the air gap between photo-sensitive device 34 and light source 35 of sensing means 33 thus preventing passage of the signal from photo-sensitive devices 34 and preventing recommencement of heating.

So long as one or other of masks 37 or 38 is in the light-intercepting position no current will flow through transistors 59 and 60 and relay winding 61 will remain deenergized.

As the temperature begins to drop both masks 37 and 38 will move out of this light-intercepting position and heating current will again flow to maintain a stable temperature. If for some reason such cooling cycle should continue for an excessive time a dangerous condition may arise and in this case sensing devices 30 and 32 will detect passage of galvanometer arm 12 adjacent thereto in the manner described. When this occurs relays 62 and 63 of sensing circuit 58 (not shown) will be switched which may be connected to suitable safety controls preventing further operation of any associated equipment whilst the low temperature condition persists. Reversal of these relays will occur when the temperature is brought up to normal operating temperature once more.

Various modifications and alternatives of the invention may be adopted in particular circumstances and some such further embodiments will be described below by way of example.

Figure 4:
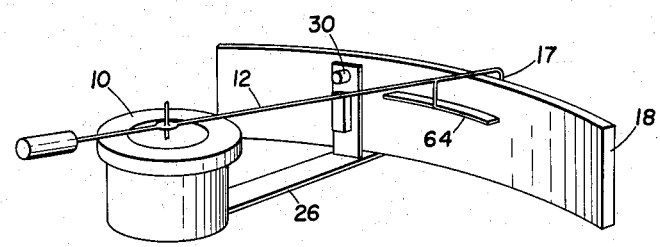
FIGURES 4 to 10 show alternative embodiments of the invention.

Thus FIGURE 4 discloses a control device generally similar to that of FIGURE 1 but utilizing only one locating arm 26 carrying the sensing means 30 thereon. In this case only a single masking member 64 is required which may be extended to cover a greater arc over about 25 percent of the arc of index 18 and hence continue to mask photo diode 35 of sensing device 30 while pointer 12 continues to rise. In this case the circuit of FIGURE 3 will be modified by the provision of block 57 having only one photo diode 34, block 58 being superfluous in this case.

Figure 5:
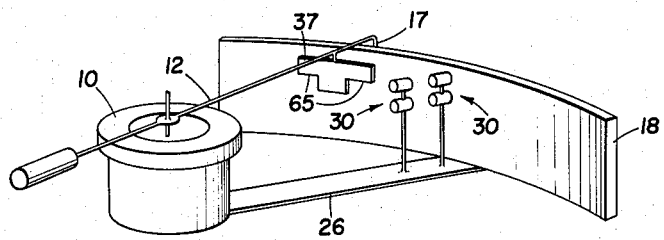
Figure 6:
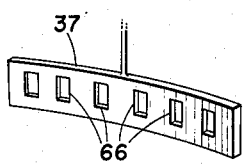
Figure 7:
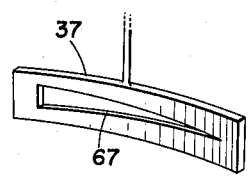
Figure 8:
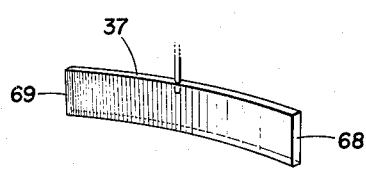

FIGURE 5 shows a modified form of masking member 37 which is this case is provided with a stepped edge 65 for registering with a series of sensing devices 30 located at different positions along arm 26 or 27 for example operating the same in sequence. Any suitable counting system coupled, if desired, with a memory circuit (not shown) will record successive signals from sensing devices 30 which may, for example, operate progressive controls, such as heating elements, in sequence thereby smoothing the changeover and minimizing rapid fluctuations in condition. A further alternative modification of masking member 37 is shown in FIGURE 6 which in this case is provided with perforations 66 operating in a similar manner to stepped edge 65. FIGURES 7 and 8 show further alternative modifications of masking member 37. FIGURE 7 shows a masking member 37 having a single opening 67 therein of elongated triangular shape admitting progressively more or less light therethrough. The masking member 37 of FIGURE 8 achieves the same result by utilizing transparent material 68 progressing gradually to an opaque area 69. In this case the circuit of FIGURE 3 may be modified by the provision of block 58 with only one sensing device 30 but having two or more relays 63 operating at different voltages and thereby responsive to different intensities of light falling on photo diode 34.

Figure 9:
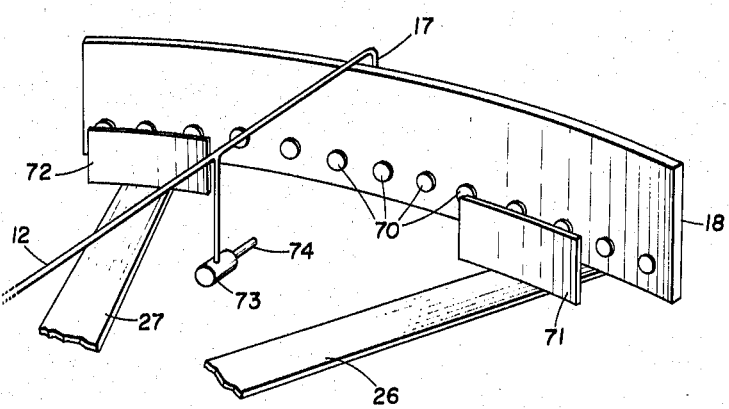

A further alternative method of providing multiple signals for counting as aforesaid is shown in FIGURE 9. This embodiment comprises a series of photo diodes 70 fastened to the inner surface of index 18 and oriented along radial axes directed towards shaft 13. Arms 26 and 27 carry shields 71 and 72 swingable together and apart to provide adjustable masking of photo diodes 70 over greater or lesser arcs. Light source 73 is mounted on galvanometer arm 12 and is focussed, as by plastic rod 74, into a narrow beam directed along the axis thereof. Operation of this embodiment can take place in two ways. Thus shields 71 and 72 can be swung apart to expose photo diodes 70 over a central arc while masking those at each end of the arc. Photo diodes 70 in this embodiment are connected in parallel whereby light falling on any one of them will ensure passage of current and activation of relays 62 and 63. However when light is interrupted by either of shields 71 or 72 current will cease to flow thus de-energising relays 62 and 63 for control of the mechanism as desired.

Alternatively shields 71 and 72 may be swung into overlapping relation marking a central arc portion and exposing those photo diodes 70 at either end of the arc. In this case the circuit will merely require to incorporate relays 62 and 63 operating in the reverse direction to provide for condition control in the same manner as above. In either case a counting system and memory circuit can advantageously be added to increase the accuracy and adaptability of the instrument.

Figure 10:
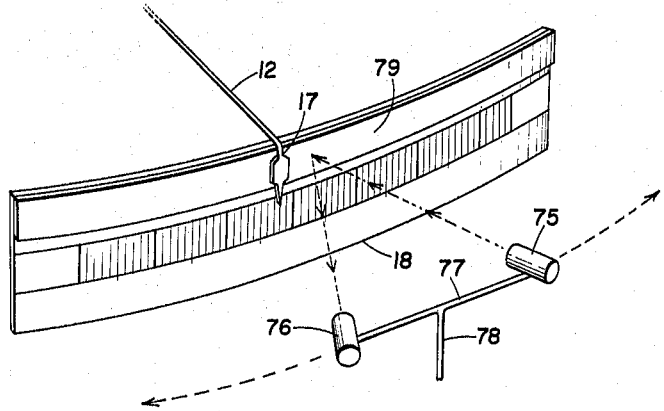

FIGURE 10 shows a modified form of the invention suitable for use in conjunction with existing control apparatus or in other special situations. In this case the needle 17 itself acts as the flag for interrupting light falling on the sensing device. To achieve this objective light source 75 and photo diode 76 are mounted in fixed relation on bracket 77 which is itself movably mounted on any suitable means such as support 78 for movement around an arcuate path concentric with the arc of movement of needle 17, spaced a distance away therefrom. Mirror 79 is fastened to index 18 behind needle 17 and normally reflects light from light source 75 to photo diode 76, which are oriented in fixed relation to ensure this result. However, passage of needle 17 over mirror 79 will interrupt such light and the circuit of FIGURE 3 will be broken, as described above. Any suitable holding relay (not shown) may be utilized to hold the circuit of FIGURE 3 at this point and maintain such condition until a second pass of needle 17 through light from light source 75 occurs freeing such relay and permitting operation of the heating elements or like equipment to maintain a stable condition.

Further alternative embodiments may include, for example, the provision of an instrument with a scale 18 extending around a greater arc, up to 270 degrees or more, having greater accuracy over the same range or having an increased range while retaining the advantages of flexible, adaptable control throughout the range.

It will thus be seen that the invention provides an instrument which may be adapted to suit many different control functions and applications with a minimum of redesigning and utilizing a large number of interchangeable units, more or less of which may be associated together in any particular situation to perform the desired operation.

At the same time the instrument of the invention is essentially a relatively simple, rugged unit incorporating improved safety features by reason of the fact that the circuit of FIGURE 3, and its alternative embodiments will in most cases fail safe. Thus failure of a photo diode, a transistor, or a relay winding will in almost all cases ensure that the instrument is in the "off" condition, as if no light were falling on photo diodes 34, and no current will pass. The possibility of mechanical failure, such as damage to mask member 37 is remote since it is not in contact with another part of the mechanism except the galvanometer arm 12. Furthermore in the embodiment of FIGURE 1 mask member 38 will still be available to operate at a somewhat higher temperature. The possibility of failure of the galvanometer 10 itself or the thermocouple (not shown) is present in the majority of such instruments but will normally be apparent from the face of the instrument and is in most cases protected against by burn-out protection circuits of known design.

The foregoing is a description of a preferred embodiment of the invention which is here made by way of example only. It is not intended that the invention should be limited to the apparatus described but comprehends all such variations as come within the spirit and scope of the appended claims.

What I claim is:

1. Condition responsive automatic control apparatus comprising:
   a galvanometer connectible in a circuit to be responsive to variations in said condition;
   a galvanometer arm movable in response to said variations;
   photo sensitive means mounted adjacent said galvanometer arm;
   light generating means for activating said photo sensitive means mounted in registration with and spaced from the same;
   mask means mounted on said galvanometer arm for movement therewith into and out of said spacing between said photo sensitive means and said light generating means to respectively cover and uncover said photo sensitive means;
   a series of perforations formed in said mask means to permit light to pass therethrough at successive intervals in response to movement of said mask means as aforesaid;
   and switch means responsive to said photo sensitive means.

2. Condition responsive automatic control apparatus comprising:
   a galvanometer connectible in a circuit to be responsive to variations in said condition;
   a galvanometer arm movable in response to said variations about a predetermined arcuate path;
   a plurality of photo sensitive devices mounted side by side around an arcuate path parallel to the arc described by said galvanometer arm;
   light generating means for activating said photo sensitive means mounted in registration therewith and spaced therefrom;
   mask means mounted on said galvanometer arm for movement therewith into the spacing between said photo sensitive means and said light generating means into and out of registration with each said photo sensitive devices in turn to respectively cover and uncover the same in sequence;
   and switch means responsive to said photo sensitive devices.

3. Condition responsive automatic control apparatus comprising:
   a galvanometer connectible in a circuit to be responsive to variations in said condition;
   a galvanometer arm movable in response to said variations about a predetermined arcuate path;
   a plurality of photo sensitive means mounted about an arcuate concentric with said arcuate path adjacent said galvanometer;
   light generating means for activating each said photo sensitive means in sequence;
   said light generating means being spaced from said photo sensitive means and mounted on said galvanometer arm for movement in unison therewith;
   means focusing said light into a narrow beam;
   a control arm mounted for movement co-axially with said galvanometer arm;
   mask means mounted on said control arm for movement into and out of said spacing between said photo sensitive means and said light generating means to selectively cover and uncover said photo sensitive means;
   and switch means responsive to said photo sensitive means.

4. Condition responsive automatic control apparatus comprising:
   a galvanometer connectible in a circuit to be responsive to variations in said condition;
   a galvanometer arm movable in response to said variations;
   photo sensitive means mounted adjacent said galvanometer;
   light generating means for activating said photo sensitive means;
   mask means mounted for movement into and out of registration with said photo sensitive means to respectively cover and uncover the same;
   perforations formed in said mask means to permit light to pass therethrough at intervals to procure successive covering and uncovering of said photosensitive means in response to movement relative thereto;
   counting means responsive to respective interruptions of light falling on said photo sensitive means to provide a control signal at a predetermined count of such interruptions;
   and, switch means responsive to said control signal.

5. Condition responsive automatic control apparatus comprising:
   a galvanometer connectible in a circuit to be responsive to variations in said condition;
   a galvanometer arm movable in response to said variations about an arcuate path;
   a plurality of photo sensitive devices mounted side by side around an arcuate path concentric with to the arc described by said galvanometer arm;

light generating means for activating said photo sensitive devices, said light generating means being mounted on said galvanometer arm for movement in unison therewith;

means focusing said light into a narrow beam to procure selective activation of said photo-sensitive devices in sequence;

counting means responsive to respective activations by light falling on said photo sensitive devices to provide a control signal at a predetermined count of such activations;

and, switch means responsive to said control signal.

6. Condition responsive automatic control apparatus comprising: a galvanometer connectible in a circuit to be responsive to variation in said condition and having a movable arm; at least two locating arms swingably mounted on said galvanometer for rotational movement about a common axis therewith; follower members slidably mounted on respectively said locating arms, and means threadably engaging said follower members for adjustably moving said arms; at least two photo-sensitive devices each mounted on respective ones of said locating arms; at least two light sources each mounted on respective ones of said locating arms in opposition to respective said photo-sensitive devices; at least one mask member attached to said movable galvanometer arm and movable therewith along a predetermined path in response to variations in said condition between said light sources and respective ones of said photo-sensitive devices; and switch means responsive to said photo-sensitive devices.

7. Condition responsive apparatus as claimed in claim 6, including follower members for respective said locating arms slidably mounted therein, means threadably engaging said follower members, and flexible drive means connected to said threaded means.

8. Condition responsive apparatus as claimed in claim 6, including spring means attached to said galvanometer arm by one end, a crank member attached to the other end of said spring means, and movable about a common axis with said galvanometer arm, a follower member mounted on said crank member, and adjustment means threadably engaging said follower member for movement thereof.

References Cited by the Examiner
UNITED STATES PATENTS

| | | | |
|---|---|---|---|
| 1,638,103 | 8/1927 | Roucka | 250—231 X |
| 2,218,502 | 10/1940 | Breintenstein | 250—231 X |
| 2,236,255 | 3/1941 | Young | 250—231 |
| 2,715,707 | 8/1955 | Haskins | 250—237 X |
| 3,028,503 | 4/1962 | Stevenson | 250—231 |
| 3,054,928 | 9/1962 | Schrenk et al. | 250—231 X |
| 3,082,328 | 3/1963 | Mohring | 250—231 |

RALPH G. NILSON, *Primary Examiner.*

ARCHIE R. BORCHELT, *Examiner.*

E. STRICKLAND, W. STOLWEIN,
*Assistant Examiners.*